United States Patent [19]
Kondo

[11] Patent Number: 6,005,319
[45] Date of Patent: Dec. 21, 1999

[54] TORQUE MOTOR HAVING UNIFORM TORQUE OUTPUT CHARACTERISTIC

[75] Inventor: Jiro Kondo, Obu, Japan

[73] Assignee: Denso Corporation, Japan

[21] Appl. No.: 09/218,082

[22] Filed: Dec. 22, 1998

[30] Foreign Application Priority Data

Jan. 14, 1998 [JP] Japan .................................. 10-005806

[51] Int. Cl.[6] .............................. H02K 33/02; F02D 9/02
[52] U.S. Cl. ........................ 310/156; 310/36; 310/49 R
[58] Field of Search ................................ 310/49 R, 162, 310/254, 156, 36

[56] References Cited

U.S. PATENT DOCUMENTS

| | | | |
|---|---|---|---|
| 4,095,129 | 6/1978 | Tanai et al. | 310/49 R |
| 4,714,851 | 12/1987 | Bertram et al. | 310/156 |
| 4,742,259 | 5/1988 | Schaefer et al. | 310/156 |
| 5,016,588 | 5/1991 | Pagdin | 123/399 |
| 5,705,873 | 1/1998 | Sato | 310/193 |

*Primary Examiner*—Nestor Ramirez
*Assistant Examiner*—Burt Mullins
*Attorney, Agent, or Firm*—Nixon & Vanderhye P.C.

[57] ABSTRACT

A torque motor comprises a rotor having a pair of permanent magnet groups, and a pair of stator cores. Each magnet group includes a plurality of plate and rod-shaped permanent magnets arranged in a circumferential direction. The magnet groups are arranged asymmetrically with respect to a rotary axis of the rotor. That is, one magnet group is displaced one-half angle of the pitch angle of each permanent magnet from the symmetric position of the other magnet group with respect to the rotary axis of the rotor. Alternatively, the stator cores are arranged asymmetrically with respect to the rotary axis of the rotor so that a front end of one stator core is displaced from the symmetric position of a front end of the other stator core in the circumferential direction. A circular arc angle for one of the stator cores ends facing the rotor is greater than a circular arc angle for the other stator core facing the rotor. Accordingly, a range of a torque generating angle of the motor is increased.

7 Claims, 6 Drawing Sheets

TORQUE MOTOR HAVING UNIFORM TORQUE OUTPUT CHARACTERISTIC

CROSS REFERENCE TO RELATED APPLICATION

This application relates to and incorporates herein by reference Japanese Patent Applications No. 10-5806 filed on Jan. 14, 1998.

BACKGROUND OF THE INVENTION

This invention relates to a torque motor and, more particularly to a torque motor which may be used as an actuator for a throttle apparatus of an internal combustion engine and the like.

As disclosed in JP-A 3-31529, a conventional torque motor has a rotor, a stator and a solenoid coil. The rotor includes permanent magnets shaped arcuately as a part of the rotor. The stator is made of magnetic substance to surround the rotor. The solenoid coil generates magnetic pole of the stator when it is energized. The rotor is rotatably actuated when the magnetic pole of the stator attracts a magnetic pole of the rotor, and such conventional torque motor may be used as an actuator for a throttle valve apparatus for an internal combustion engine.

It is proposed that a torque motor uses a plurality of plate-shaped permanent magnets on its outer periphery. In other words, a torque motor has a rotor comprising a rotor core and two permanent magnet groups arranged 180° oppositely to each other, that is, symmetrically with respect to a rotary axis of the rotor. The permanent magnet groups are spaced apart from each other on the rotor core in the circumferential direction. The magnet group has a plurality of plate-shaped permanent magnets arranged in the circumferential direction on a part of the outer periphery of the rotor core, while the other magnet group has the same number of plate-shaped permanent magnets arranged in the similar manner on another part of the rotor core. The stator cores are joined at a pair of stator core connecting parts. The connecting parts for the corresponding magnet groups are provided 180° oppositely to each other on the circumference of the rotor core. The rotor is held rotatably inside of a pair of stator cores between which solenoid units are sandwiched.

The above torque motor generates a torque varying in dependence on the rotational angle of the rotor. In other words, generated torque is reduced in certain range of rotational angle of the rotor.

SUMMARY OF THE INVENTION

It is therefore an object of the present invention to provide a torque motor which increases its rotational angle range which generates required torque.

According to an aspect of the present invention, a torque motor comprises a stator having a pair of magnetic poles when the stator is energized, and a rotor having a pair of magnet groups. The magnetic poles of the stator have respective front ends to which the magnet groups approach first during rotation of the rotor. A circular arc angle for one of the magnetic poles facing the rotor is greater than a circular arc angle for the other magnetic pole facing the rotor.

Accordingly, negative torque is generated at the one of the magnetic poles having the greater circular arc angle during a rotational anaphase when the rotor is rotated by positive torque generated by an attraction of one of the magnet poles to the other front end, thereby preventing the torque decrease. Therefore, the rotational angle range for generating a constant torque is increased.

According to another aspect of the present invention, each of the magnet groups has a plurality of permanent magnets arranged in a circumferential direction. Either one of front ends of the magnetic poles of the stator and the magnet groups are arranged asymmetrically with respect to a rotary axis of the rotor. Preferably, the front end of one of the magnetic poles of the stator aligns with a circumferential center of one of permanent magnets of one magnet group when the front end of the other magnetic pole of the stator aligns with a circumferential end of one of the permanent magnets of the other magnet group.

Accordingly, change of magnetic flux for each of the magnet groups is canceled, thereby reducing the torque fluctuation.

According to another aspect of the present invention, a ratio of the greater circular arc angle for one of the magnetic poles to the smaller circular arc angle for the other magnetic pole is less than 1.3. Accordingly, the torque decrease is reduced.

According to another aspect of the present invention, one end of a control angle range of the motor locates within a negative angle of a rotational angle, of the rotor, which generates approximately constant torque, and the other end of the control angle range locates within a positive angle of the rotational angle of the rotor. Accordingly, approximately constant torque is obtained within the rotational angle region, and the rotational angle is controlled accurately. Thus, it is suitable for an actuator such as a throttle valve apparatus.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF A PREFERRED EMBODIMENT

Figure 1:
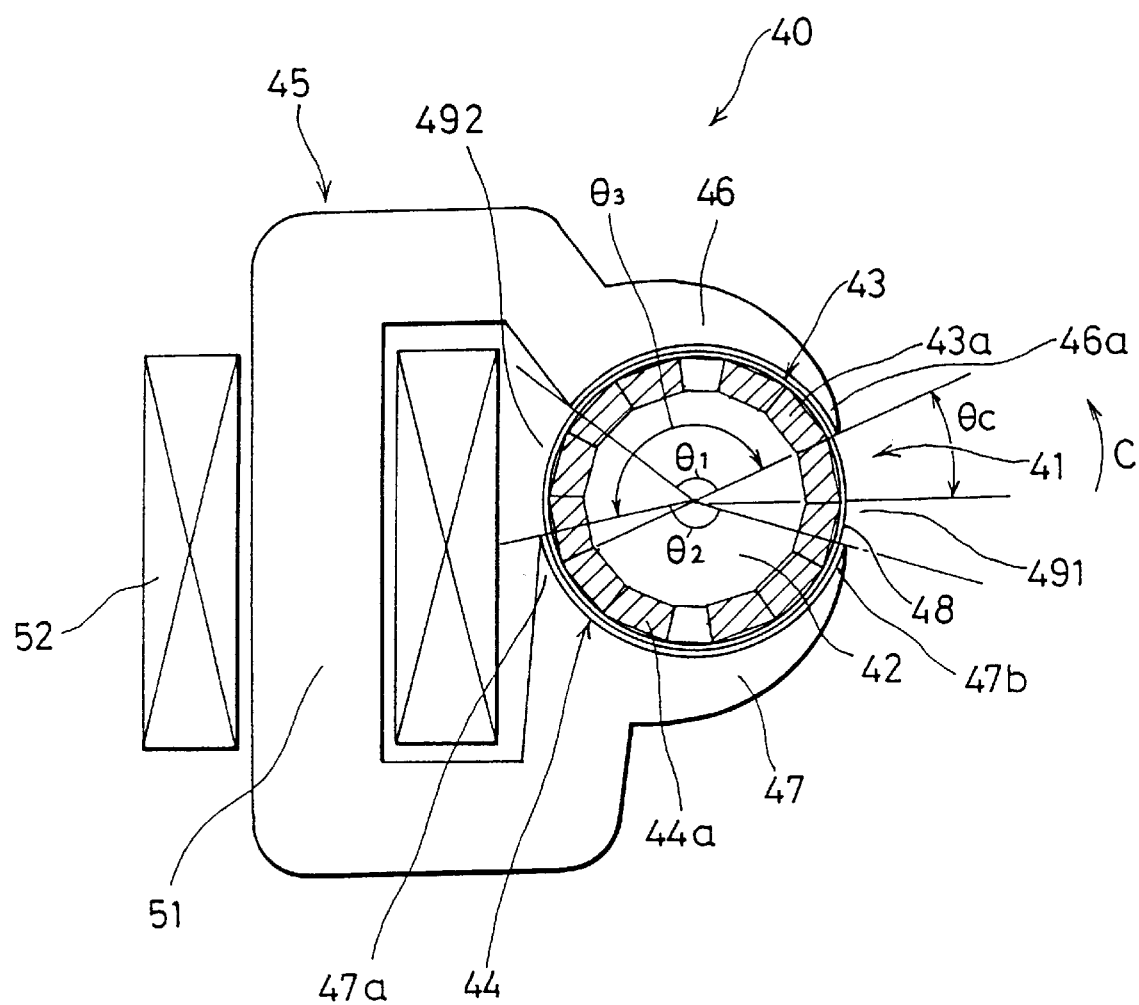
FIG. 1 is a schematic illustration showing a torque motor as viewed in the direction I in FIG. 5 according to an embodiment of the present invention.

A torque motor according to the present invention is applied to a throttle control apparatus for an internal combustion engine in the following embodiments, throughout which the same or like parts are denoted by the same or like reference numerals.

A torque motor 40 according to an embodiment of the present invention is shown in FIG. 1. The rotor 41 comprises a pipe-shaped rotor core 42 and a pair of permanent magnet groups 43 and 44 provided on the rotor core 42 oppositely to each other in the radial direction with respect to the rotary axis of the rotor 41. The magnet groups 43 and 44 have a plurality of (six in this embodiment) plate-shaped permanent magnets 43a and 44a each in same size, respectively, and are attached to the outer periphery of the rotor core 42 by an adhesive. The permanent magnets 43a and 44a are arranged tightly in the circumferential direction in each of the magnet groups 43 and 44. The permanent magnets 43a and 44a are the same in number and positioned 180° apart from each other., leaving spaces between the magnet groups 43 and 44 in the circumferential direction.

Each magnet 43a, 44a is magnetized in the radial direction of the rotor 41 and arranged so that one of the magnet groups 43 and 44 provides N-pole at its radially outermost peripheral surface while the other of the same provides S-pole at its radially outermost peripheral surface. Thus, the magnet groups 43 and 44 provide one N-pole and one S-pole on the radially opposing peripheral surfaces of the rotor 41. It is desired that each magnet is made of rare earth magnetic material such as neodymium family material and samarium-cobalt family material which generates high magnetism. However, other magnetic materials such as ferrite system material may also be used.

Figure 5:
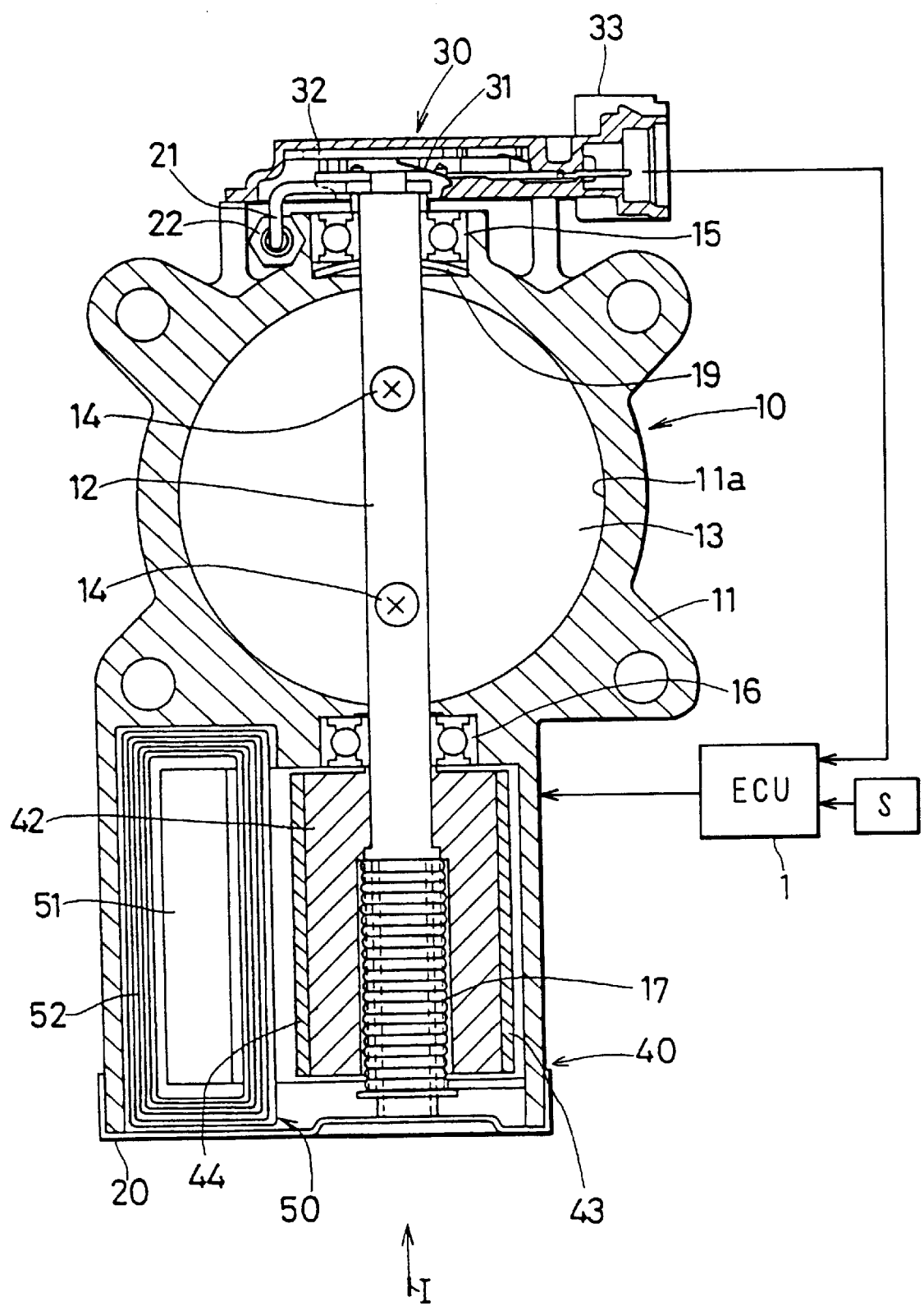
FIG. 5 is a sectional view showing a throttle valve control device using the torque motor according to the embodiment of the present invention.

Stator 45 is formed by piling a plurality of thin magnetic steel plates in an axial direction of throttle shaft 12 (see FIG. 5), and comprises U-shaped arm portion 51 and teeth portions 46, 47 which surround the rotor 41 to form magnetic poles of the stator 45. One end of the arm portion 51 is connected to the teeth portion 46, and the other end is connected to the teeth portion 47. Each of the teeth portions 46 and 47 is formed such that its cross sectional area gradually decreases toward its end.

A solenoid unit comprises the arm portion 51 and coil 52 which is wound around the arm portion 51. The teeth portions 46 and 47 form a pair of magnetic poles of the stator 45 when the coil 52 is energized. By changing the energizing direction to the coil 52, the poles (N-pole or S-pole) of the teeth portions 46 and 47 can be changed. Accordingly, the rotor 41 rotates in the counterclockwise direction as shown in FIG. 1 by an arrow C, or in the clockwise direction.

Assuming that a magnet arranging pitch angle of each of the magnets 43a and 44a for the entire outer periphery of the rotor 41 is θc, a circular arc angle θ3 between a front end 46a of the teeth portion 46 and a front end 47a of the teeth portion 47 is equal to 180°−θc/2 (θ3=180°−θc/2). In other words, the front end 46a of the teeth portion 46 and the front end 47a of the teeth portion 47 are arranged to deviate one half (θc/2) of the magnet arranging pitch angle θc from the symmetrical arrangement. Thus, the magnetic pole pair on the rotor 41 and the magnetic pole pair on the stator are displaced one half of the magnet arranging pitch angle (θc), that is, one half of the each magnet pitch, in the circumferential direction. Thus, when the front end 46a aligns with the circumferential end (magnet pitch end) of the magnet 43a, the front end 47a aligns with the approximate circumferential center (magnet pitch center) of the magnet 44a.

In this embodiment, each of the teeth portions 46 and 47 has a "front end" and a "rear end". The "front end" faces rotating magnets 43a, 44a prior to the "rear end" when the rotor 41 rotates counterclockwise as shown by the arrow C in FIG. 1.

Accordingly, the fluctuation of generated torque, which varies periodically in dependence on the rotational angle of the rotor 41, shifts in phase a one-half cycle. Therefore, the torque ripples generated around the front ends 46a and 47a cancel each other, and stable torque is obtained.

Assuming that a circular arc angle for the teeth portion 46 facing the rotor 41 is θ1, and that a circular arc angle for the teeth portion 47 facing the rotor 41 is θ2, θ2 is greater than θ1 (θ1<θ2). Assuming that a circular arc angle ratio θ2/θ1=r, r is greater than one (r>1).

A cylindrical cover 48 covers outer periphery of the rotor 41 to prevent the magnets 43a, 44a from dropping or damages. Since the cover 48 is made of magnetic material, the cover 48 is magnetized by the magnets 43a and 44a to reduce the air gaps between the poles of the rotor 41 and inner peripheries of the teeth portions 46, 47. Furthermore, the magnetic flux from the magnets 43a and 44a pass through the cover 48 in a direction of the tangent at the outer periphery of the rotor 41. Accordingly, magnets 43a, 44a, which are positioned at places corresponding to slots 491, 492 between the teeth portions 46 and 47, are attracted to the ends (edges) of the teeth portions 46, 47.

The torque motor 40 generates approximately constant torque within a certain rotational angle of the rotor 41. In this embodiment, negative angle and positive angle are defined by a center of such certain rotational angle, and one end of a control angle range of the torque motor 40 locates at the negative angle, and the other end of the control angle range of the torque motor 40 locates at the positive angle. A state in which the rotor 41 locates at the negative angle is called rotational prophase. A state in which the rotor 41 locates at the positive angle is called rotational anaphase.

Figure 6:
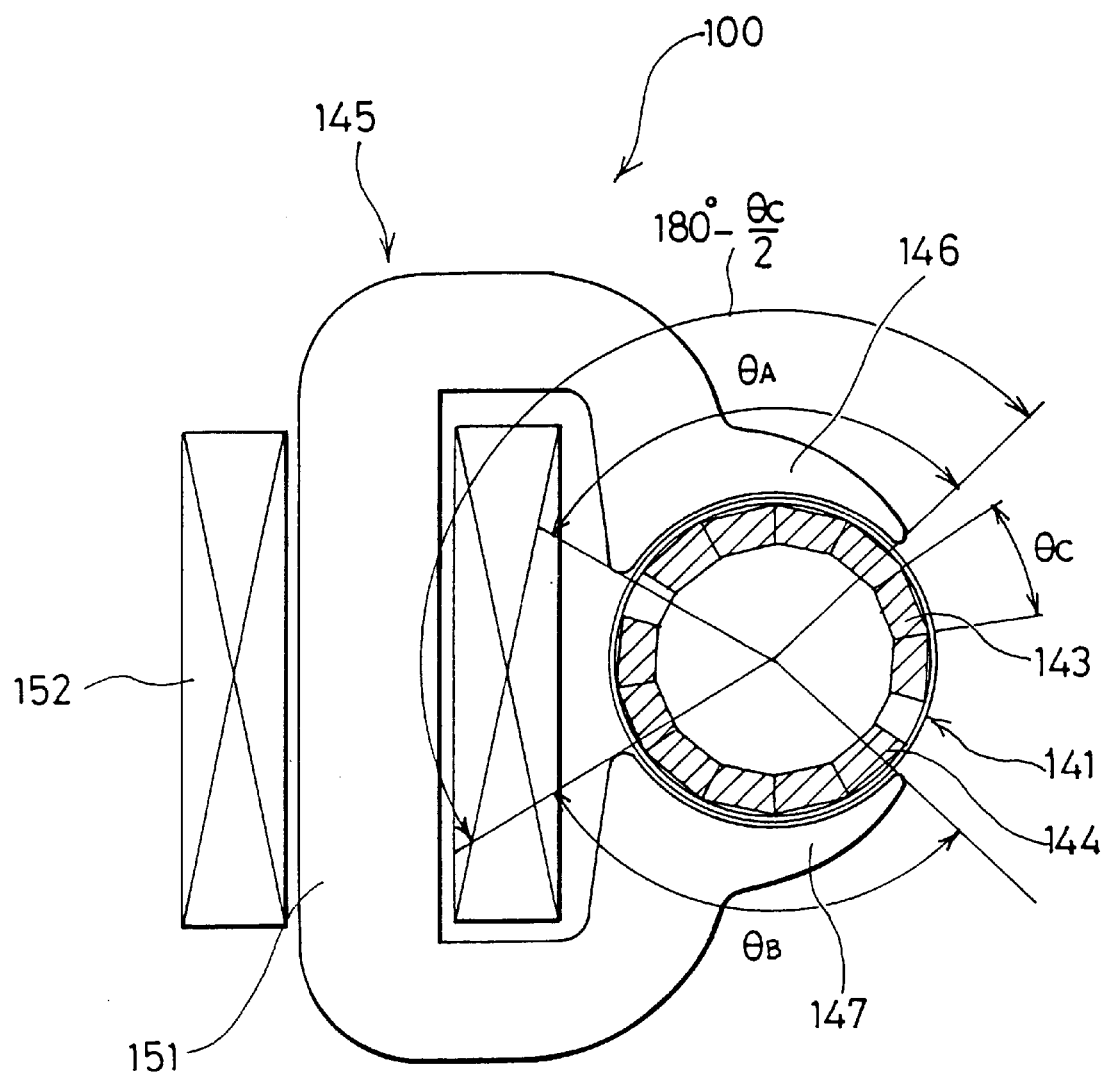
FIG. 6 is a schematic illustration showing a torque motor as viewed in the same direction of FIG. 1 according to the comparative example.
Figure 7:
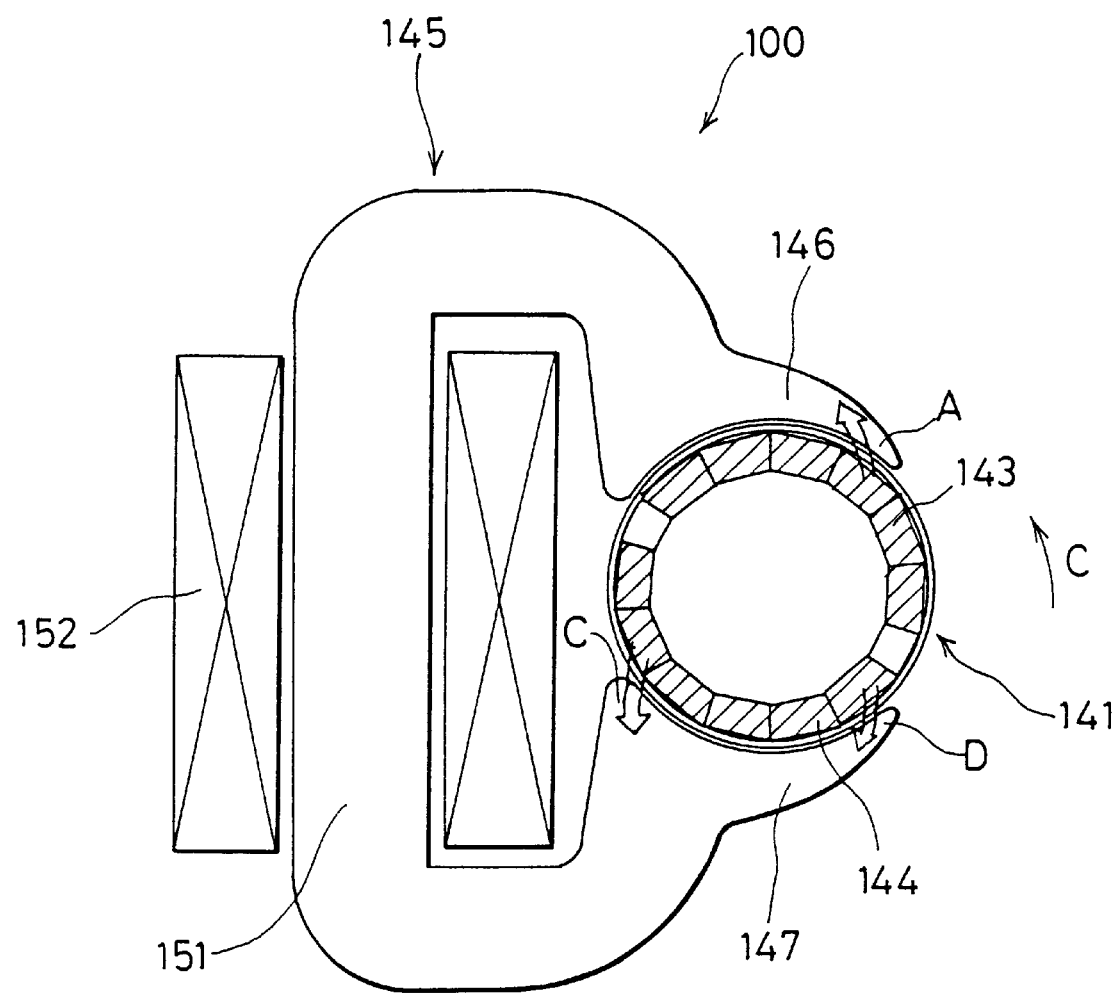
FIG. 7 is a schematic illustration showing a torque motor as viewed in the same direction of FIG. 1 according to the comparative example.

FIGS. 6 and 7 are schematic illustrations showing a torque motor 100 of a comparative example to explain the advantage of the embodiment. The torque motor 100 has an arm portion 151, a stator 145 comprises teeth portions 146 and 147, a rotor 141 comprises permanent magnets 143 and 144, and a coil 152. Front end of the teeth portion 146 and front end of the teeth portion 147 are arranged to deviate one half (θc/2) of the magnet arranging pitch angle θc of the magnets 143, 144 from the symmetrical arrangement.

In the comparative example, a circular arc angle θA facing the teeth portion 146 is equal to a circular arc angle θB facing the teeth portion 147 (θA=θB) as shown in FIG. 6.

According to the torque motor 100 of the comparative example, as shown in FIG. 7, negative torque in clockwise direction is generated around a rear end D of the teeth portion 147 during the rotational anaphase by attracting the magnet 144 passed the rear end D to the teeth portion 147, while positive torque in counterclockwise direction (direction shown by the arrow C) is generated around front end portions A and C of the teeth portions 146 and 147. Therefore, the positive torque which rotates the rotor 141 counterclockwise is reduced. Accordingly, certain rotational angle region for generating approximate constant torque is reduced.

According to the torque motor of the embodiment of the present invention as shown in FIG. 1, however, the negative torque, generated at the rear end 47b during the rotational anaphase when the rotor rotates counterclockwise, is reduced because θ2 is greater than θ1. Accordingly, the torque generated during the rotational anaphase is increased, and the rotational angle region which generates approximate constant torque is increased.

Figure 2:
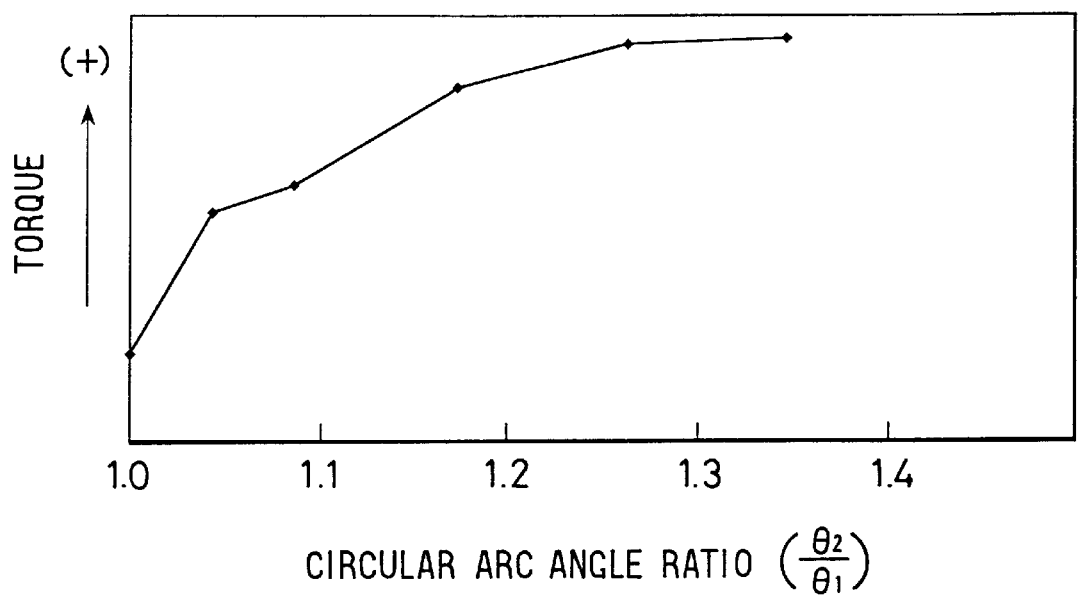
FIG. 2 is a characteristic graph showing a relation between the torque generated during the rotational anaphase and the circular arc angle ratio r ($\theta 2/\theta 1$) when the rotor rotates counterclockwise according to the embodiment of the present invention.
Figure 3:
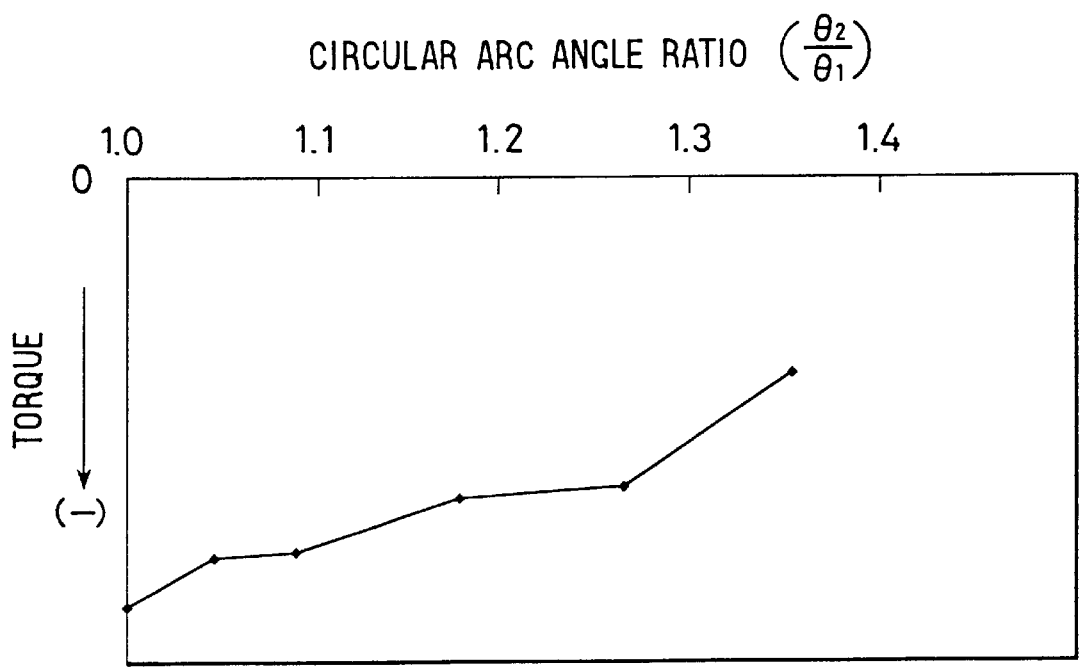
FIG. 3 is a characteristic graph showing a relation between the torque generated during the rotational prophase and the circular arc angle ratio r ($\theta 2/\theta 1$) when the rotor rotates clockwise according to the embodiment of the present invention.

FIG. 2 shows a relation between the torque generated during the rotational anaphase and the circular arc angle ratio r(θ2/θ1) when the rotor 41 rotates counterclockwise (arrow C in FIG. 1). FIG. 3 shows a relation between the torque generated during the rotational prophase and the circular arc angle ratio r (θ2/θ1) when the rotor 41 rotates clockwise. The circular arc angle ratio r of the comparative example is one (r=1).

As shown in FIG. 2, the torque generated during the rotational anaphase when the rotor 41 rotates counterclockwise (arrow C in FIG. 1) increases as the circular arc angle ratio r becomes greater than one, and it becomes approximately constant when the circular arc angle ratio r is greater than 1.3.

On the other hand, as shown in FIG. 3, the torque generated during the rotational prophase when the torque motor 40 rotates clockwise decreases as the circular arc angle ratio r becomes greater, because a rotational angle corresponding to the slot 491 decreases as the circular arc angle θ2 increases, and thereby the number of magnets 43a which is attracted to the end of the teeth portion 47 decreases. Especially, the torque extremely decreases when the circular arc angle ratio r is greater than 1.3. Therefore, it is desirable to set the circular arc angle ratio r between 1 and 1.3 (1<r<1.3).

Figure 4:
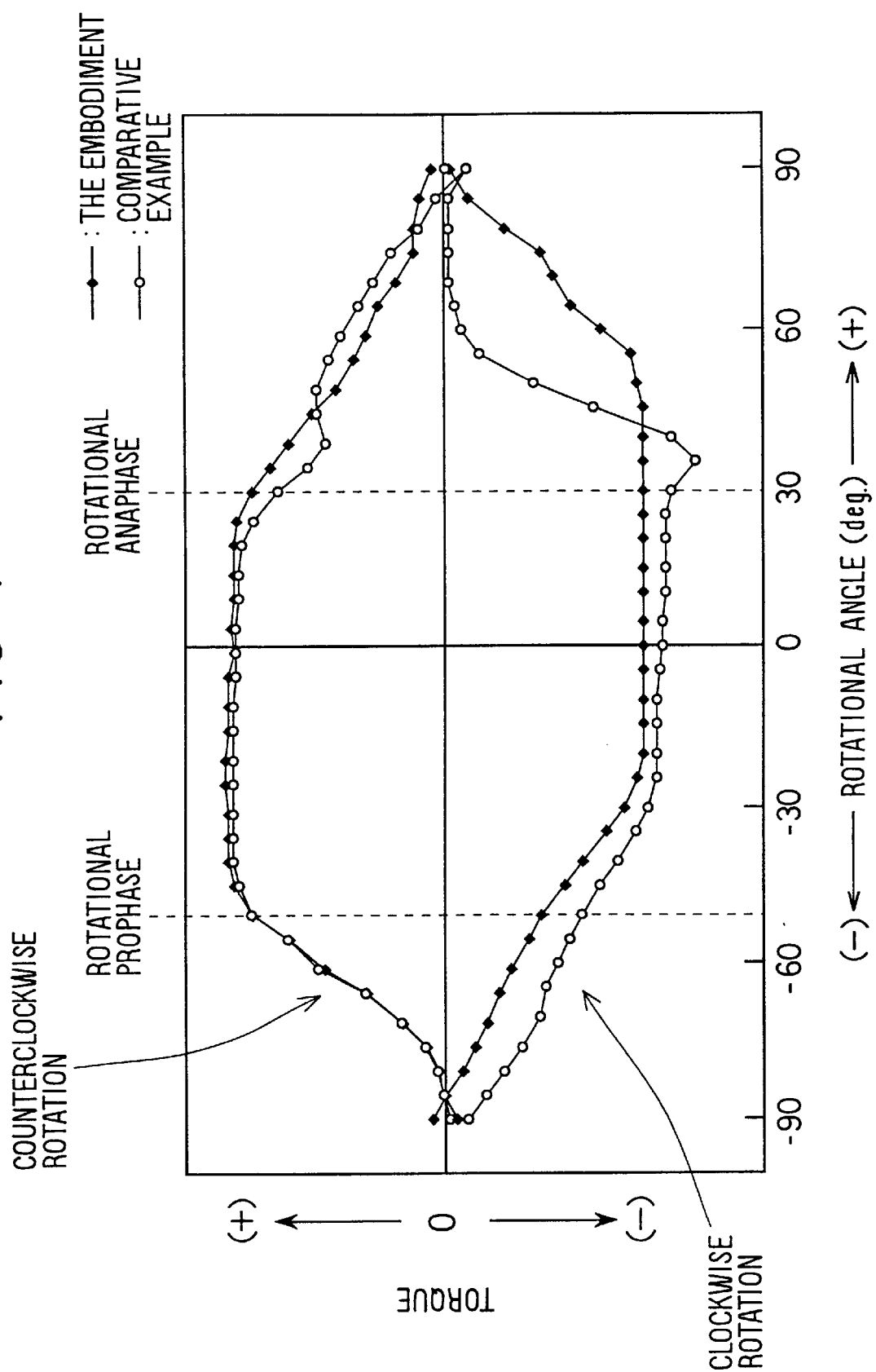
FIG. 4 is a characteristic graph showing relations between the generated torque and the rotational angle of the rotor when the rotor rotates counterclockwise and clockwise according to a comparative example and the embodiment of the present invention.

FIG. 4 shows relations, in each of the embodiment and the comparative example, between the generated torque and the rotational angle of the rotor 41 when the rotor 41 rotates counterclockwise (arrow C in FIG. 1) and clockwise. According to the embodiment of the present invention, as understood from the FIG. 4, the rotational angle range which generates constant torque is wider than that of the comparative example because the torque generated at the rotational prophase is approximately the same as that of the comparative example, and the torque generated at the rotational anaphase is greater than that of the comparative example when the rotor 41 rotates counterclockwise. Although the torque generated at the rotational prophase according to the embodiment of the present invention is smaller than that of the comparative example when the rotor 41 rotates clockwise, it is acceptable because the torque decrease is small if the circular arc angle ratio r is between 1 and 1.3 (1<r<1.3).

A throttle valve control device 10 has the torque motor 40 as an actuator which variably controls opening angle of a throttle valve 13. The throttle valve 13 is in a disk shape and is fixed to a throttle shaft 12 by screw threads 14. A throttle body 11 supports rotatably the throttle shaft 12 by a pair of bearings 15 and 16, so that the throttle valve 13 rotates with the throttle shaft 12 to vary an intake air flow area of an intake air passage 11a defined by the inner wall surface of the throttle body 11.

The throttle shaft 12 fixedly supports a throttle lever 21 at its one end to rotate the lever 21 together with the throttle shaft 12. A stopper screw 22 is provided to abut the throttle lever 21, thus defining a fully-closed position of the throttle valve 13. The fully-closed position of the throttle valve 13 is adjustable by the threaded position of the stopper screw 22.

A rotational angle sensor 30 is fixed to one axial end of the throttle shaft 12. It comprises a contact part 31, a substrate 32 formed with a resistor in a film form and a housing 33 which fixedly supports the substrate 32. The contact part 31 is press-fitted into the throttle shaft 12 for rotation with the throttle shaft 12, and slidable on the resistor formed on the substrate 32. With a constant voltage (5V) being applied to the resistor on the substrate 32, and the contact part 31 sliding on the resistor in response to the rotary movement of the throttle valve 13, the sensor 30 produces a voltage varying with the rotary position of the throttle valve 13 to indicate the rotary position of the throttle valve 13.

A core 42 of the torque motor 40 is fixed to the other axial end of the throttle shaft 12. One end of return spring 17 is connected to the core 42, and the other end is connected to the throttle body 11 to bias the throttle valve 13 toward the closing direction. A cover 20 closes a side end of the torque motor 40.

Wave washer 19 biases the throttle shaft 12 in its axial direction such that the throttle shaft 12 may not move in its axial direction during engine vibration. Accordingly, the sliding condition between the contact part 31 and the substrate 32. Therefore, disconnection of the opening signal of the throttle valve 13 and abrasion of the contact part 31 or resistor on the substrate 32 are prevented. Furthermore, the torque fluctuation on the rotor 41 is reduced because axial position of the rotor 41 against the stator 45 does not change.

The control angle range of the torque motor 40 is determined such that the fully-closed position of the throttle valve 13 corresponds to the rotational prophase of the torque motor 40, and the fully-opened position of the throttle valve 13 corresponds to the rotational anaphase of the torque motor 40. In other words, one end of the control angle range of the torque motor 40 locates at the negative angle, and the other end locates at the positive angle. Therefore, approximately constant torque is obtained within the rotational angle region, and the rotational angle of the throttle valve 13 is controlled accurately.

When the negative torque is generated, for example, in order to rotate the throttle valve 13 toward the fully-closed direction or to stop the rotating throttle valve 13 toward the fully-opened direction quickly, the torque decrease for the clockwise rotation is minimized because the circular arc angle ratio r is between 1 and 1.3 (1<r<1.3) according to the embodiment of the present invention.

The throttle control device 10 using the above torque motor operates as follows.

(1) Normal Running Condition:

In normal vehicle running including idling mode and automatic cruising mode, a desired opening angle of the throttle valve 13 is calculated by an electronic controller (ECU) 1 based on an engine operating condition such as an accelerator depression and engine rotational speed detected by a sensor S. A control current is supplied to the solenoid coil 52 in accordance with the calculated desired opening angle. With the torque generated when the solenoid coil 52 is thus energized, the rotor 41 rotates against the biasing force of the return spring 17.

The throttle valve 13 also rotates with the rotor 41 to open. The throttle opening angle is detected by the rotational angle sensor 30 and fed back to the ECU 1. The ECU 1 thus feedback controls the throttle opening angle by varying the control current supplied to the solenoid coil 52. This feedback control reduces temperature-dependent changes in the generated torque, thereby controlling the throttle opening angle accurately.

(2) Failure Condition:

When the actual throttle opening angle detected by the detector 30 deviates from the desired throttle opening angle calculated by ECU 1, ECU 1 determines the throttle opening angle control to be in failure. ECU 1 then close the throttle valve 13 by the return spring 17, thereby restricting the throttle valve 13 from opening excessively.

Furthermore, ECU 1 includes a sub-ECU for diagnosing a failure of ECU 1 all the time. When a failure of ECU 1 is detected, the sub-ECU then stops the control current to the solenoid coil 52 to close the throttle valve 13 by the return spring 17.

In the embodiment of the present invention, the magnet groups 43 and 44 have a plurality of (six in this embodiment) plate-shaped permanent magnets 43*a* and 44*a* each in same size, respectively, and are attached to the outer periphery of the rotor core 42 by an adhesive, and the magnets 43*a* and 44*a* are arranged tightly in the circumferential direction in each of the magnet groups 43 and 44. However, the magnets 43*a* and 44*a* may be positioned to have gaps therebetween, instead. Furthermore, arc-shaped magnets may be used instead of the plate-shaped permanent magnets 43*a* and 44*a*.

In the embodiment of the present invention, the front end 46*a* of the teeth portion 46 and the front end 47*a* of the teeth portion 47 are arranged to deviate one half ($\theta c/2$) of the magnet arranging pitch angle $\theta c$ from the symmetrical arrangement. Thus, the magnetic pole pair on the rotor 41 and the magnetic pole pair on the stator are displaced one half of the magnet arranging pitch angle ($\theta c$), that is, one half of the each magnet pitch, in the circumferential direction. Thus, when the front end 46*a* aligns with the circumferential end (magnet pitch end) of the magnet 43*a*, the front end 47*a* aligns with the approximate circumferential center (magnet pitch center) of the magnet 44*a*.

However, it is possible to arrange the teeth portions 46, 47 of the stator 45 symmetrically, and to arrange the magnet groups 43 and 44 such that the one-half pitch angle ($\theta c/2$) of the magnet pitch angle ($\theta c$) is deviated from the symmetrical line on which the other magnet group is aligned.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A motor comprising:

a rotor having a pair of magnet groups thereon for providing a pair of magnetic poles respectively around a rotary axis thereof;

a solenoid unit; and a stator coupled with the solenoid unit for providing a pair of magnetic poles which face the magnetic poles of the rotor when the solenoid unit is energized, the magnetic poles of the stator having respective front ends that the magnet groups approach first during rotation of the rotor, wherein a circular arc angle of one of the magnetic poles of the stator facing the rotor is greater than a circular arc angle of the other of the magnetic poles of the stator facing the rotor, wherein each of the magnet groups includes a plurality of permanent magnets arranged in a circumferential direction; and one of the magnetic poles of the stator and the magnet groups are arranged such that the front end of one of the magnetic poles of the stator aligns with a circumferential center of one of the permanent magnets of one of the magnet groups when the front end of the other of the magnetic poles of the stator aligns with a circumferential end of one of the permanent magnets of the other of the magnet groups, and wherein one of the magnet groups is displaced in the circumferential direction from a symmetric line crossing the rotary axis of the rotor and the circumferential center of the other of the magnet groups.

2. A motor according to claim 1, wherein a ratio of the greater circular arc angle for of said one of the magnetic poles of the stator facing the rotor to the smaller circular arc angle of the other magnetic pole of the stator facing the rotor is less than 1.3.

3. A motor according to claim 1, wherein the torque motor generates approximately constant torque within a certain rotational angle of the rotor, a negative angle and a positive angle being defined by a center of said certain rotational angle; and wherein one end of a control angle range of the motor locates within the negative angle of said certain rotational angle of the rotor; and the other end of the control angle range locates within the positive angle of said certain rotational angle of the rotor.

4. A motor according to claim 1, wherein each of the permanent magnets is in one of a plate and rod shape in section.

5. A motor according to claim 1, wherein the permanent magnets in each of the magnet groups are separated from each other in the circumferential direction.

6. A motor according to claim 1, wherein the rotor has a magnetic member covering the magnet groups.

7. A motor according to claim 6, wherein the magnetic member is in a cylindrical shape.

* * * * *